May 22, 1934.    K. KAUTZ    1,959,791
WELDING IRON, STEEL, AND THEIR ALLOYS
Filed Jan. 28, 1932
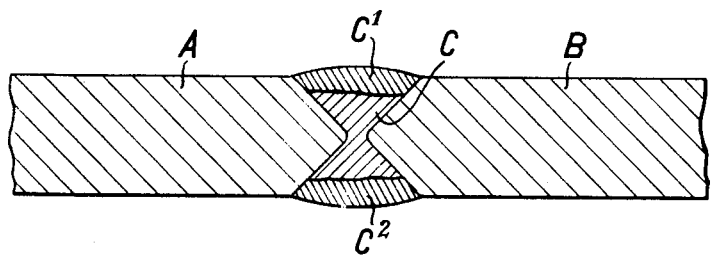
INVENTOR
KURT KAUTZ
BY
ATTORNEYS Patented May 22, 1934

1,959,791

UNITED STATES PATENT OFFICE 1,959,791

WELDING IRON, STEEL, AND THEIR ALLOYS

Kurt Kautz, Essen, Germany, assignor to Fried. Krupp Aktiengesellschaft, Essen-on-the-Ruhr, Germany Application January 28, 1932, Serial No. 589,357
In Germany February 6, 1931

2 Claims. (Cl. 219—10)

My invention relates to a method of welding iron, steel and their alloys whereby a seam will be established in which the requisite strength for the uses to which the welded product is put will be supplied by a layer or layers of chemically neutral chrome-nickel steel united within the seam with material welded in place but of a different composition, such seams being sufficiently controllable in their constitution to assure a strength commensurate with the exactions imposed on the finished article in its use. It has heretofore been proposed to use for the whole of the welding seams welding rods of the composition of the well known chemically neutral chromium nickel steel alloys, as described and claimed in my co-pending patent application Serial Number 565,697, filed September 28, 1931. By the application of that method a welding seam of such a high strength is obtained as is not required in many cases. The object of my present invention is therefore, to modify the said method in so far as it is not the whole welding seam which is made from a chemically neutral chromium nickel steel alloy by means of welding rods, but only one or more layers of the welding seam. By this new method I attain the possibility of graduating the strength of the welding seam as desired and saving expensive chromium nickel steel welding rod material.

In order that my invention may be clearly understood and readily carried into effect, I have illustrated diagrammatically in the accompanying drawing by a sectional view a welding seam made in accordance with the method forming the subject matter of my present invention.

The two pieces to be welded together are denoted by A and B. In welding the edge portions of the two sections to be united are brought into proximity with each other the part C of the welding seam is established first, for instance by means of an ingot iron welding rod, whereupon the outer layers $C^1$ and $C^2$ of the welding seam are applied for which welding rods of a chemically neutral chromium nickel steel alloy are employed. The quantity of the chromium nickel steel alloy used in the seam will, of course, in each instance, be such as to suffice to contribute to the seam a major portion of its strength. In certain cases it will be sufficient to apply such a cover layer of chromium nickel steel only on that side of the seam which is exposed to the higher stress.

As will be seen from the foregoing, my improved welding method affords the possibility to graduate at will the strength of the welding seam and to impart high strength and resistance to chemical attacks just to the outermost endangered fibre thereof.

It will be noted that the process hereinabove described contemplates bringing edge portions of the two sections to be united into proximity with each other and welding these edge portions together by the successive melting therebetween of a plurality of welding rods, at least one of which is composed of a chemically neutral chrome nickel steel, while another is of a material of different composition, the latter material being first introduced into the seam and the former being thereupon deposited thereon to constitute one or both of the exposed parts of the seam, and causing the chemically neutral chrome nickel steel to solidify within the seam in laminar form upon and after union with the other material contained in the seam and of course in each case in quantities sufficient to contribute to the seam a major portion of its strength.

What I claim as my invention is:—

1. The method of welding iron, steel, and their alloys, which comprises bringing edge-portions of the two sections to be united into proximity with each other and welding said edge portions together by the successive melting therebetween of a plurality of welding rods at least one of which is composed of a chemically neutral chrome-nickel steel while another is of a material of different composition, the latter material being first introduced into the seam and the former being thereupon deposited thereon to constitute at least one of the exposed parts of the seam, and causing the chemically neutral chrome-nickel steel to solidify within the seam in laminar form upon and in union with the other material contained in the seam and in a quantity sufficient to contribute to the seam a major portion of its strength.

2. The method of welding iron, steel, and their alloys, which comprises bringing edge portions of the two sections to be united into proximity with each other and welding said edge portions together by the successive melting therebetween of two different welding rods, one of which is composed of chemically neutral chrome-nickel steel, while the other is material of different composition, the latter material being first introduced into the seam and the former being thereupon deposited thereon at each of the two exposed surfaces of the seam to constitute the whole of the exposed parts of the entire seam, and causing the chemically neutral chrome-nickel steel to solidify within the seam in laminar form upon and in union with the other material contained in the seam and in a quantity sufficient to contribute to the seam a major portion of its strength.

KURT KAUTZ.